United States Patent
Hall et al.

(10) Patent No.: US 10,640,344 B1
(45) Date of Patent: May 5, 2020

(54) EXTENDABLE PIVOTING WINCH ASSEMBLY

(71) Applicant: HALL LABS LLC, Provo, UT (US)

(72) Inventors: David R. Hall, Provo, UT (US); Daniel Madsen, Vineyard, UT (US); Jerome Miles, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/255,794

(22) Filed: Jan. 23, 2019

(51) Int. Cl.
*B66D 1/36* (2006.01)
*B60D 1/38* (2006.01)
*B66D 1/48* (2006.01)

(52) U.S. Cl.
CPC ............... *B66D 1/365* (2013.01); *B60D 1/38* (2013.01); *B66D 1/485* (2013.01); *B66D 2700/0191* (2013.01)

(58) Field of Classification Search
CPC ................ B66D 1/365; B66D 1/485; B66D 2700/0191; B60D 1/38
See application file for complete search history.

(56) References Cited

U.S. PATENT DOCUMENTS

| | | | | |
|---|---|---|---|---|
| 3,524,606 A * | 8/1970 | Coski | .................... | B66D 1/365 242/484.2 |
| 3,536,298 A * | 10/1970 | Deslierres | ................ | B66D 1/50 114/254 |
| 4,650,163 A * | 3/1987 | Peterson | .................. | B66D 1/00 254/327 |
| 5,445,487 A * | 8/1995 | Koscinski, Jr. | ........ | B60P 1/5433 212/232 |
| 5,791,858 A * | 8/1998 | Sasser | .................... | A22B 5/161 414/462 |
| 5,913,507 A * | 6/1999 | Lauricella, Jr. | .......... | B66D 1/04 254/325 |
| 6,138,991 A * | 10/2000 | Myers, Jr. | .............. | B66C 23/44 212/180 |
| 6,386,514 B1 * | 5/2002 | Ray | ......................... | B66D 1/12 254/323 |
| 6,523,806 B2 * | 2/2003 | Bartal | ..................... | B66D 1/00 254/272 |
| 6,672,568 B1 * | 1/2004 | Rawlinson | ........... | A01B 59/066 254/323 |
| 6,951,345 B2 * | 10/2005 | Wilks | ....................... | B60D 1/36 242/397.5 |
| 7,111,826 B2 * | 9/2006 | Cook | ..................... | B66C 23/48 254/329 |
| 7,344,120 B2 * | 3/2008 | McFarland | ............. | B66D 1/00 224/511 |

(Continued)

Primary Examiner — Michael E Gallion

(57) ABSTRACT

The invention is an extendable winch assembly, that include a winch, having a drum for winding and unwinding a line and a first motor for driving the drum about a winding axis. The assembly also includes a winch mount for mounting the winch to a vehicle, the winch mount. The winch mount includes a base attached to the vehicle and extendable arm attached at one end to the base, wherein the extendable arm is configured to move the winch from a retracted position proximate the vehicle to an extended position spaced from the vehicle. The winch mount also includes a plate attached at an other end of the extendable arm, wherein the winch is attached to the plate in such a way as to allow the winch to pivot about a pivot axis perpendicular to the winding axis.

19 Claims, 7 Drawing Sheets

(56) References Cited

U.S. PATENT DOCUMENTS

| | | | | |
|---|---|---|---|---|
| 7,770,870 | B1* | 8/2010 | Fly | B60D 1/065 |
| | | | | 224/512 |
| 8,820,718 | B2* | 9/2014 | Weidner | B66D 1/00 |
| | | | | 254/329 |
| 9,038,990 | B2* | 5/2015 | Krappinger | B66D 1/36 |
| | | | | 254/331 |
| 9,527,707 | B1* | 12/2016 | Fehringer | B66F 7/26 |
| 9,630,816 | B1* | 4/2017 | Napieralski | B66C 23/005 |
| 9,719,632 | B2* | 8/2017 | Weidner | F16M 13/022 |
| 9,783,399 | B2* | 10/2017 | Hausladen | B66D 1/30 |
| 9,802,800 | B2* | 10/2017 | Kalakay, Jr. | B66D 3/26 |
| 9,909,713 | B1* | 3/2018 | Brockie | F16M 13/022 |
| 10,173,870 | B1* | 1/2019 | Hall | B66D 1/485 |
| 10,280,051 | B2* | 5/2019 | Hall | B66D 1/38 |
| 2005/0056819 | A1* | 3/2005 | Pockl | B66D 1/365 |
| | | | | 254/277 |
| 2007/0029267 | A1* | 2/2007 | Hall | B62H 3/12 |
| | | | | 211/17 |
| 2007/0108731 | A1* | 5/2007 | McBroom | B60D 1/36 |
| | | | | 280/477 |
| 2014/0175353 | A1* | 6/2014 | Hoffend, Jr. | B66D 1/54 |
| | | | | 254/376 |
| 2016/0221807 | A1* | 8/2016 | Kleinatland | B66D 1/12 |
| 2018/0090953 | A1* | 3/2018 | Hall | B66D 1/12 |
| 2018/0257917 | A1* | 9/2018 | Hall | B66D 3/006 |

* cited by examiner

US 10,640,344 B1

EXTENDABLE PIVOTING WINCH ASSEMBLY

TECHNICAL FIELD

The present disclosure relates generally to the field of winches.

BACKGROUND

Winches are pulling or lifting devices, which pull in or let out a line. Winches function by winding or unwinding the line that is coiled around a rotating drum. A winch fairlead is commonly used to direct the line as it winds or unwinds along the drum. Typically, the line should be at a shallow angle, 20 degrees or less, from perpendicular to the drum axis. When this is achieved, friction is minimized between the line and the internal edges of the fairlead that surround the line. Most efficiently, the line is exactly perpendicular to the drum axis. Thus, a problem arises if the line is connected to a load that is at a wide angle, such as when the load is at an angle of 45 degrees, causing the line to be at a 45-degree angle from perpendicular to the drum axis. Friction created between the line and the fairlead reduces the pulling capacity of the winch and shortens the life of the line (can cause the line to fray, for example).

SUMMARY

In a first aspect, the invention is an extendable winch assembly, that include a winch, having a drum for winding and unwinding a line and a first motor for driving the drum about a winding axis. The assembly also includes a winch mount for mounting the winch to a vehicle, the winch mount. The winch mount includes a base attached to the vehicle and extendable arm attached at one end to the base, wherein the extendable arm is configured to move the winch from a retracted position proximate the vehicle to an extended position spaced from the vehicle. The winch mount also includes a plate attached at an other end of the extendable arm, wherein the winch is attached to the plate in such a way as to allow the winch to pivot about a pivot axis perpendicular to the winding axis.

In a second aspect, the extendable winch assembly, includes a winch, that has a drum for winding and unwinding a line, a first motor for driving the drum about a winding axis, and a fairlead through which the line passes as it wound and unwound from the drum. The assembly also includes a winch mount for mounting the winch to a vehicle. The winch mount includes a base attached to the vehicle and an extendable arm attached at one end to the base, wherein the extendable arm is configured to move the winch from a retracted position proximate the vehicle to an extended position spaced from the vehicle. A second motor is included that operates to extend and retract the extendable arm. The winch mount further includes a plate attached to an other end of the extendable arm, wherein the winch is attached to the plate in such a way as to allow the winch to pivot about a pivot axis perpendicular to the winding axis. A third motor for pivoting the winch is included in the winch mount. The winch assembly also has a controller that controls the movement of the first, second and third motors.

In another aspect, the assembly includes at least two pressure sensors mounted on the fairlead, for sensing the pressure the line exerts on the fairlead from opposing lateral directions and generating pressure data and the controller processes the pressure data and operates the third motor in such a way as to reduce the pressure on the fairlead.

In another aspect, the extendable winch assembly includes a pin or a crank for manually extending and retracting the extendable winch assembly.

In a another aspect, the extendable winch assembly includes a controller for controlling the extendable arm motor. In one example, the controller is a smart phone running an app.

In a another aspect, the extendable winch assembly includes sensors and a motor for pivoting the winch. The sensors collect pressure data and indicate to the motor in which direction to pivot or swivel the winch.

In another aspect, the controller coordinates the movement of the second and third motor so that, when the third motor pivots the winch, the second motor extends the extendable arm far enough so that the winch does not hit the vehicle.

In another aspect, the controller is configured to receive commands from a user.

In another aspect, the controller causes the second motor to extend the extendable arm to the extended position before the third motor causes the winch to pivot.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1C:
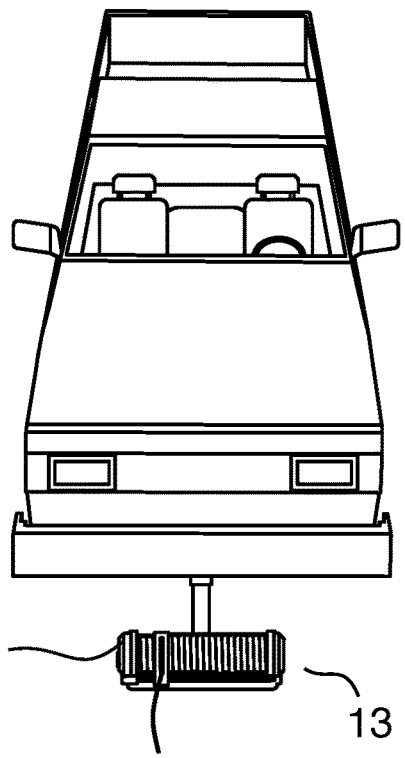
FIG. 1C is a top view of the extendable winch assembly attached to a vehicle and fully extended.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "manually" is meant to refer to being done with or by hands.

As used herein, "mechanically" is meant to refer to being done by motor.

As used herein, "arm" is meant to refer to an object capable of extending and retracting.

As used herein, "extendable" is meant to refer to the ability to be made longer.

As used herein, "nests" is meant to refer to an object fitting inside a larger one.

Winches in their most basic form have been used for many years to help hoist or move objects. Winches can be used in a variety of settings. They are used on boats, on cars, in a building, in a theatre, on a construction site, indoors or outdoors. They are extremely useful because they help users to maneuver often large or heavy equipment or materials in such a way that would be extremely difficult to do manually.

Winches are used to pull in or let out tension on a line, such as a cable or rope. There exists a wide variety of winches comprised of different materials. One of the challenges associated with winches is that pulling capacity may be diminished when a load is not perpendicular to the drum. Typically, this challenge is addressed by using a fairlead that includes rollers to reduce the friction associated with off-angle loads (loads that result in the winch line being more than 20 degrees from perpendicular with the winch drum axis, for example). However, even with a fairlead that includes rollers, the winch capacity for off-angle loads is reduced, and the pressure and friction of the fairlead may result in increased wear on the winch line and/or the winch components.

Furthermore, when a winch is able to swivel or pivot towards the object it is pulling and thus reduce friction of the line against the fairlead, the winch may run into or hit the vehicle to which it is attached or mounted if it is not far enough away from the vehicle. In other words, if the winch pivots from the center of the drum, and the distance the winch is placed from the vehicle is not the same as or greater than the distance from the middle of the drum to the end of the drum, the winch will not be able to pivot 180 degrees. For example, very often an individual will attach a winch to a vehicle such as an ATV or truck. Often, a user attaches a winch to the front of their vehicle. This is useful for transporting a winch and using the winch. However, wherein a winch is closely mounted to the front of a vehicle, it would be unable to swivel very far because it will hit or come into contact with the vehicle or become obstructed by the vehicle. Therefore, wherein a winch is made to swivel or pivot, it is useful for a winch to be able to extend away from the vehicle. Then, when a user needs to use the winch at an angle, they can move the winch such that it is sufficiently far enough from the vehicle that it can swivel and not be obstructed by the vehicle. Once the user is finished using the winch at an angle, they can retract the winch to a position that is closer to the vehicle. Storing a winch closer to the vehicle is advantageous because it less likely that the winch will get hit or come into contact with another object thereby damaging the winch of the object that it comes into contact with.

The winch may extend and retract in a variety of ways. For example, in one embodiment the winch comprises a pin, a winch mount base, and an extendable arm that nests inside the winch mount base. In another embodiment, the winch mount base nests inside the extendable arm. The user may remove the pin, extend the extendable arm, and reinsert the pin, thus allowing a user to manually extend the winch. In another embodiment, the winch comprises a crank handle in place of a pin that when cranked, extends the extendable arm. In another example, the winch is automated and can be controlled via a remote device. In one example, the remote device is a smart phone running an app. In yet another embodiment, the winch is controlled mechanically and manually, such that a user can decide to manually extend or retract the winch or use a controller to extend or retract the winch. In another embodiment, the extendable winch assembly includes a button on the winch that when pressed mechanically extends or retracts the extendable arm.

In one embodiment, wherein the extendable arm nests inside the winch mount base, the extendable arm rests on a track. In a preferred embodiment, the track includes a motor such that the extendable arm is mechanically extended or retracted. However, in a less preferred embodiment, there is no motor and the user manually moves the extendable arm along the track to extend or retract the winch. In another embodiment, wherein the winch mount base nests inside the extendable arm, the winch mount base comprises a track such that the extendable arm can extend and retract.

In a preferred embodiment, the extendable winch assembly includes an extendable arm that nests inside the base of the winch mount. The base may attach to the underside of the vehicle, or to the front, back or side. It may attach with screws or glue.

Depending on the environment and scenario in which a winch is used, one of the common use cases for winches, for example, is for a winch to be placed on a vehicle (e.g., all-terrain vehicle (ATV), truck, utility vehicle, and the like). Typically, the winch is placed at the front (or back) of the vehicle. This placement may be ideal for some use cases. A vehicle, however, may or may not be able to be situated directly in the front or the back of the load to be pulled. Furthermore, the vehicle may or may not be able to be situated on the same level as the load to be pulled. When using the winch, it is most efficient when directly facing the load it is pulling because friction is reduced, and efficiency is increased. Thus, it is beneficial for a winch to have the ability to tilt, rotate, and/or twist in order to face the load being pulled so that it is directly facing the load to be pulled.

It is appreciated that pulling off-angle reduces the efficiency and ability of all winches. Pulling off-angle, however, may be particularly problematic for winches that include a winch-line-guide that directs the line to wind along the length of the rotatable drum to avoid bunching or catching the line on the rotatable drum. In one embodiment, a motor powers the drum to rotate about an axis within a frame. A fairlead of the winch-line-guide may be connected to and may simultaneously move along the length of one or more elongated rods, which extend longitudinally within the frame in substantially parallel relation to the drum axis. As the fairlead moves along the rods, the line passes through the fairlead such that the fairlead directs the line to wind uniformly around the drum. When pulling off-angle, however, the fairlead may, at times, be unable to move along the drum length due to the force of the load working against the movement direction of the fairlead. A winch-mount that changes the direction of the drum and fairlead may resolve this problem and allow the fairlead to smoothly move along the length of the drum.

Embodiments and methods disclosed herein may improve winch performance when the load is at a wide angle to the fairlead. The present devices, systems, and methods describe a winch that includes a swivel mechanism. As described herein, the extendable winch assembly may swivel to orient itself in a way that minimizes or eliminates off-angle loads. In other words, the winch assembly may rotate towards a load that the swivel winch is pulling, such that there is less friction on the line when being wound onto the drum. This allows for increased efficiency and increases the capacity of the winch to pull heavier items or loads. The winch may be made to swivel towards the object that it is pulling in a variety of ways. In one example, the winch swivels freely. In another, it comprises sensors.

Wherein the winch swivels freely, the winch mount plate may comprise ball bearings where the winch mount plate is attached to the extendable arm, such that it can spin, swivel, or pivot freely when a load pulls on the winch line at an off angle. In another example, the winch mount plate comprises roller bearings.

In one embodiment the swivel winch may include sensors in proximity to the orifice on the fairlead which sense/detect pressure. When pressure exceeds a predetermined threshold, the swivel winch is instructed to swivel, tilt, and/or rotate in the direction that will most relieve the sensed pressure. Thus, sensors may be used to allow the fairlead to operate without decreasing efficiency.

In some embodiments, the winch mount plate (to which the winch is mounted, for example) may oscillate, rotate, balance, pivot, turn, tilt, teeter, vacillate, hover, hang, sway, and/or dither. The winch may include one or more spacers, insertions, and/or attachments between the rotatable drum and the winch mount plate. Some embodiments of the winch mount plate may include one or more protrusions, attachments, flanges, extensions, shelves, depressions, grooves and/or other surface discontinuities that interact with springs. In one embodiment, the winch mount plate may include one or more folds, bends, creases, and/or curvatures such that the degree to which the rotatable drum tilts is as much as 180° from rest. The winch mount plate may also rotate as much as 360° around the center pivot, according to one embodiment.

In one embodiment, the extendable winch assembly is electric. In another embodiment, the extendable winch assembly is hydraulic. In one embodiment, the line is synthetic rope, and in another, the line is a steel cable.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Figure 1D:
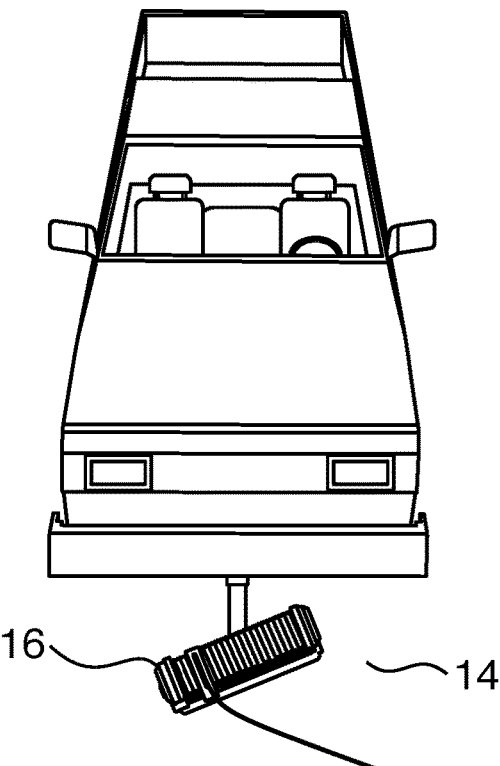
FIG. 1D is a top view of the extendable winch assembly attached to a vehicle and pivoted.
Figure 1A:
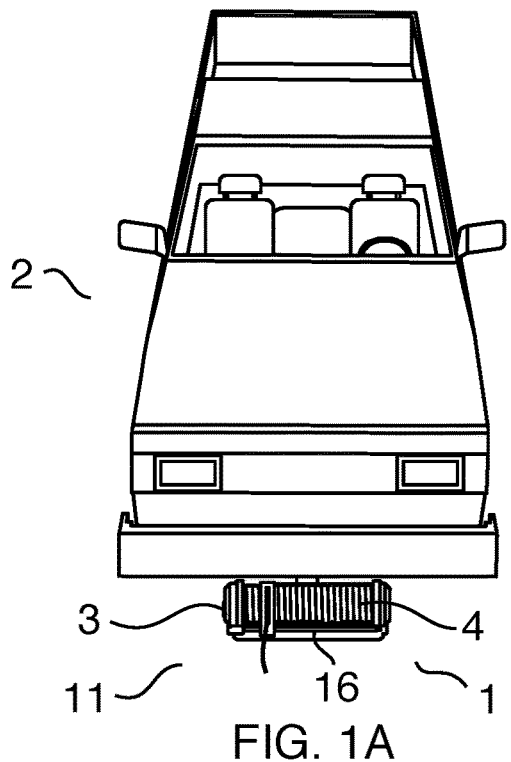
FIG. 1A is a top view of the extendable winch assembly attached to a vehicle.
Figure 1B:
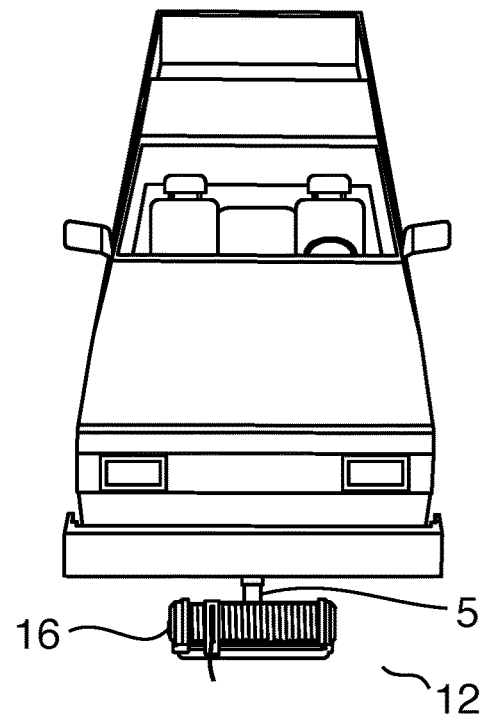
FIG. 1B is a top view of the extendable winch assembly attached to a vehicle and slightly extended.

Now, referring to FIG. 1A, an extendable winch assembly 1 is shown. In this embodiment, the extendable winch assembly 1 is attached to the front of a vehicle 2. However, in another embodiment, the extendable winch assembly 1 is attached to the back of the vehicle 2. The extendable winch assembly 1 comprises a drum 3 and a line 4 that winds and unwinds from the drum 3. The line 4 may be configured such that it may unwind off the drum 3 from left to right, or from right to left, via the fairlead 16 through a small hole, which prevents the line 4 from tangling when winding on or off the drum 3. FIG. 1A shows the extendable winch assembly 1 mounted very closely to the vehicle 2 in a first position 11. In FIG. 1B, in preparation for allowing the extendable winch assembly 1 to pivot towards an off-angle load, the extendable arm 5 has extended slightly. In a preferred embodiment, the extendable winch assembly extendable arm 5 is capable of extending at least four inches. In a more preferred embodiment, the extendable arm 5 extends at least six inches. In a most preferred embodiment, the extendable arm extends up to 12 inches. FIG. 1C shows the extendable winch assembly 1 in a third position 13 wherein the extendable winch assembly 1 is fully extended and ready to pivot. FIG. 1D shows the extendable winch assembly 1 pivoting towards a load in a fourth position 14.

The extendable winch assembly 1 in this embodiment is attached to a vehicle 2. The extendable winch assembly 1 can be mounted upon many different vehicles because it is detachable. An extendable winch assembly 1 can fit an automobile, a tractor, a truck, a boat, a tank, an armored fighting vehicle, a military engineering vehicle, an ambulance, a train, a draisine, or a reconnaissance vehicle. This is extremely useful because an extendable winch assembly 1 is designed to pull a large variety of things in a large variety of situations, and because the extendable winch assembly 1 can attach to different vehicles, it becomes useful in many more situations. For example, an extendable winch assembly 1 could attach to a truck and be used to pull a tree trunk out of the ground. It could be attached to an ATV to pull an object stuck in mud out of the mud. An extendable winch assembly 1 might also be attached to an automobile and then used to pull another automobile. An extendable winch assembly 1 might also be attached to an automobile, ATV, truck, or tractor to fell a tree, or to pull a boat out of water. The extendable winch assembly 1 is removably attached to a vehicle so that it can be attached to any one vehicle, used, then removed, and attached to another vehicle for a different purpose. Additionally, the extendable winch assembly 1 may be attached to a non-vehicle.

Figure 2A:
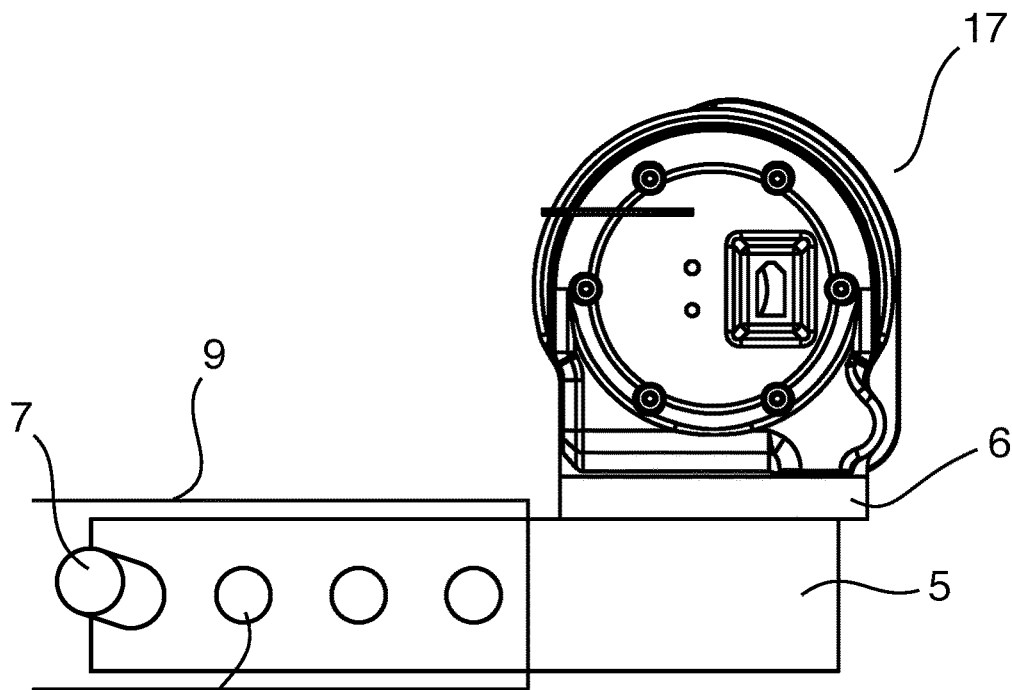
FIG. 2A is a side view of the extendable winch assembly comprising a pin.
Figure 2B:
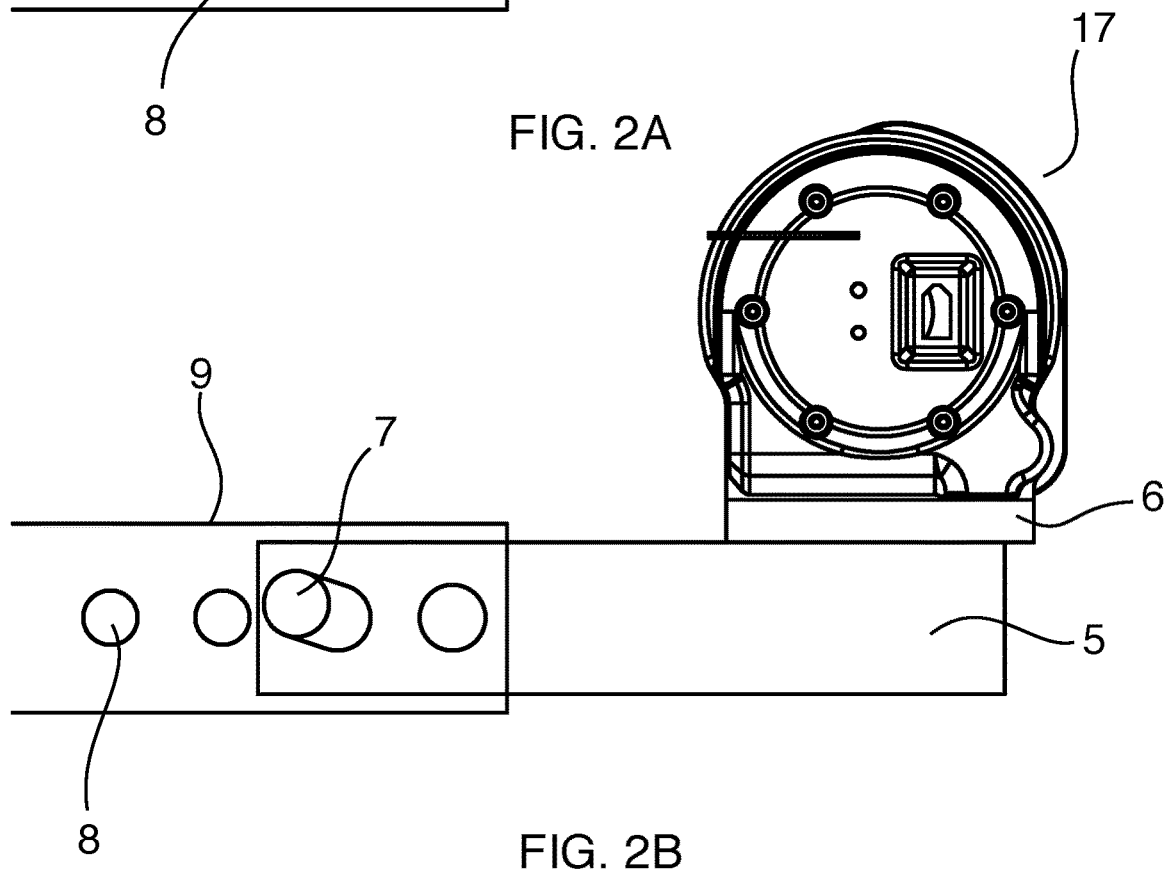
FIG. 2B is a side view of the extendable winch assembly extended and comprising a pin.

FIG. 2A depicts the extendable winch assembly 1 wherein the winch 17 is attached to the winch mount plate 6. In this embodiment, the extendable arm 5 nests inside the winch mount base 9. Furthermore, the extendable winch assembly 1 comprises pin holes 8 and a pin 7 for manually extending and retracting the extendable winch assembly 1. In FIG. 2A, the extendable winch assembly 1 is fully retracted. In contrast, FIG. 2B shows the extendable winch assembly 1 extended, such the pin 7 is now inserted into a different pin hole 8.

Figure 3:
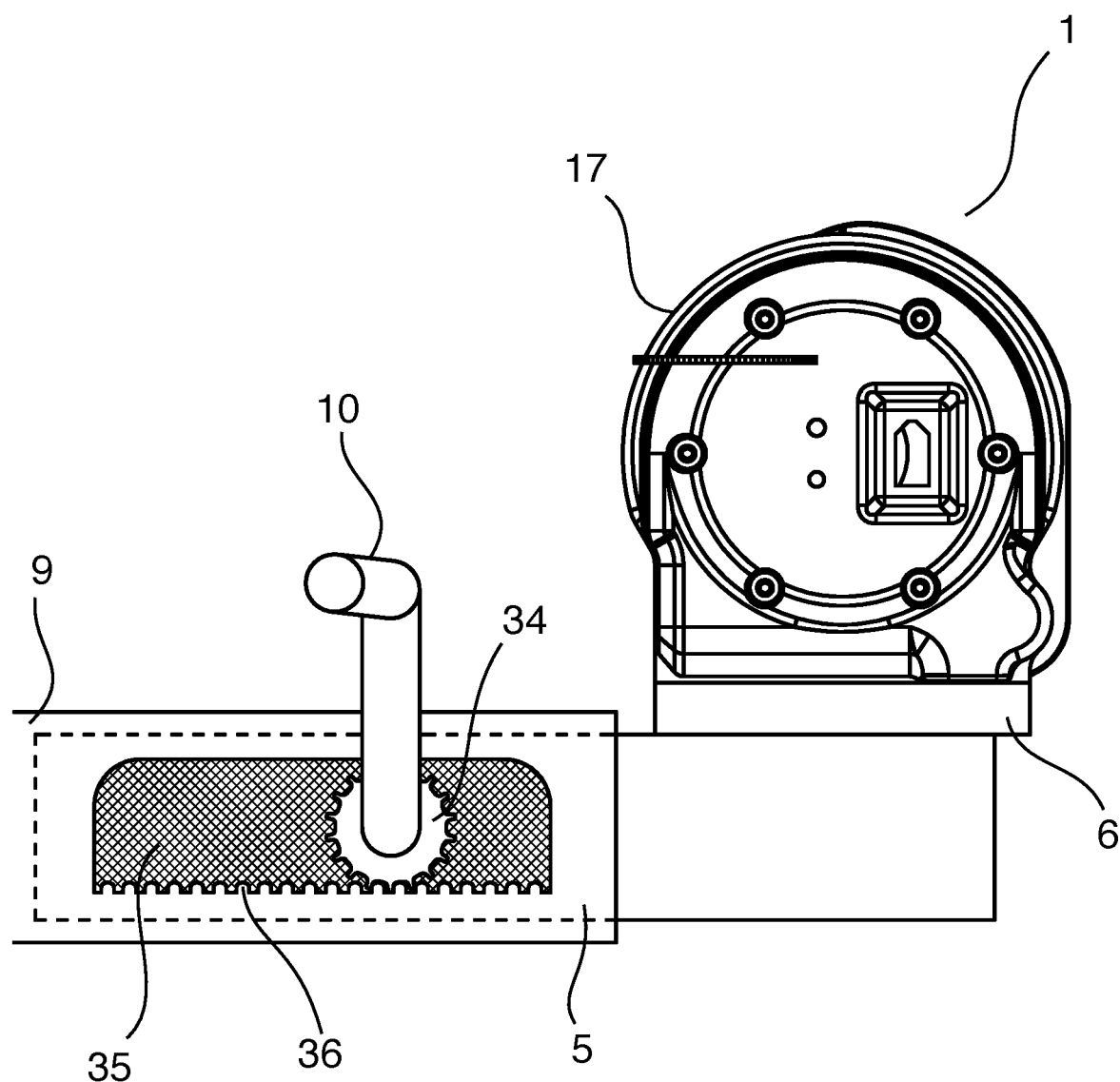
FIG. 3 is a side view of the extendable winch assembly comprising a crank.

FIG. 3 shows the extendable winch assembly 1 wherein the extendable arm 5 extends and retracts via a crank 10, which crank 10 is attached to the mount base 9. In this embodiment, the extendable arm 5 includes a cavity 35. In this embodiment, the cavity 35 does not extend through the entire extendable arm 5. A gear 34 is attached to the crank 10, and meshes with cutouts 36 of the extendable arm cavity 35, such that as an individual turns the crank 10, the gear 34 turns and the extendable arm 5 is extended or retracted, depending on the way the crank 10 is turned. The dotted lines on the extendable arm 5 indicate the portion of the extendable arm 5 that is not visible because it is inside the mount base 9.

Figure 4A:
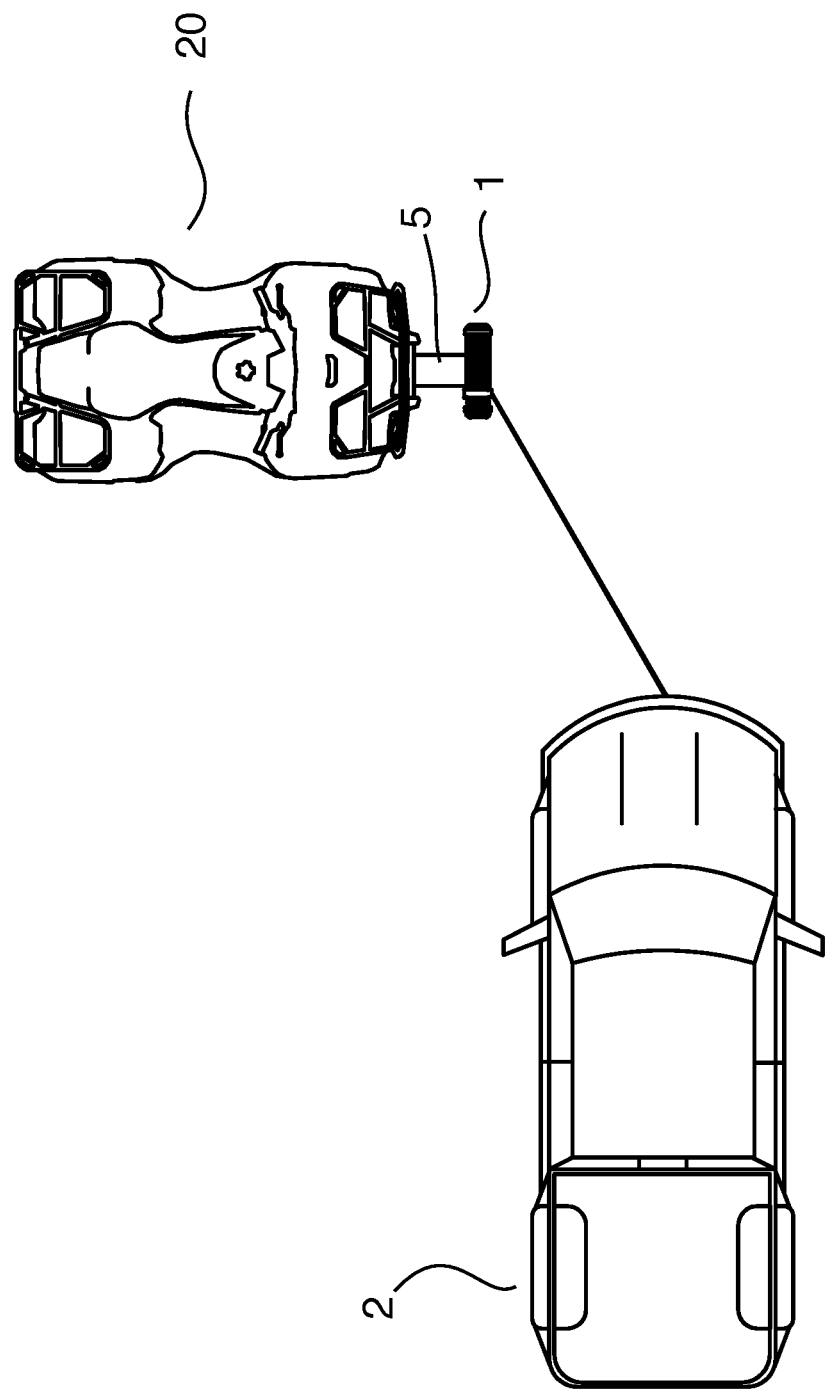
FIG. 4A is a top view of an ATV attached to the extendable winch assembly with a load attached.

FIG. 4A depicts a vehicle 2 as the load of the extendable winch assembly 1 attached to an ATV 20. The vehicle 2 is positioned at a wide angle from the extendable winch assembly 1. That is, the vehicle 2 is positioned at an angle greater than 45 degrees from perpendicular to the drum axis. Thus there is friction created from the line 4 rubbing against the fairlead 16, which is inefficient.

Figure 4B:
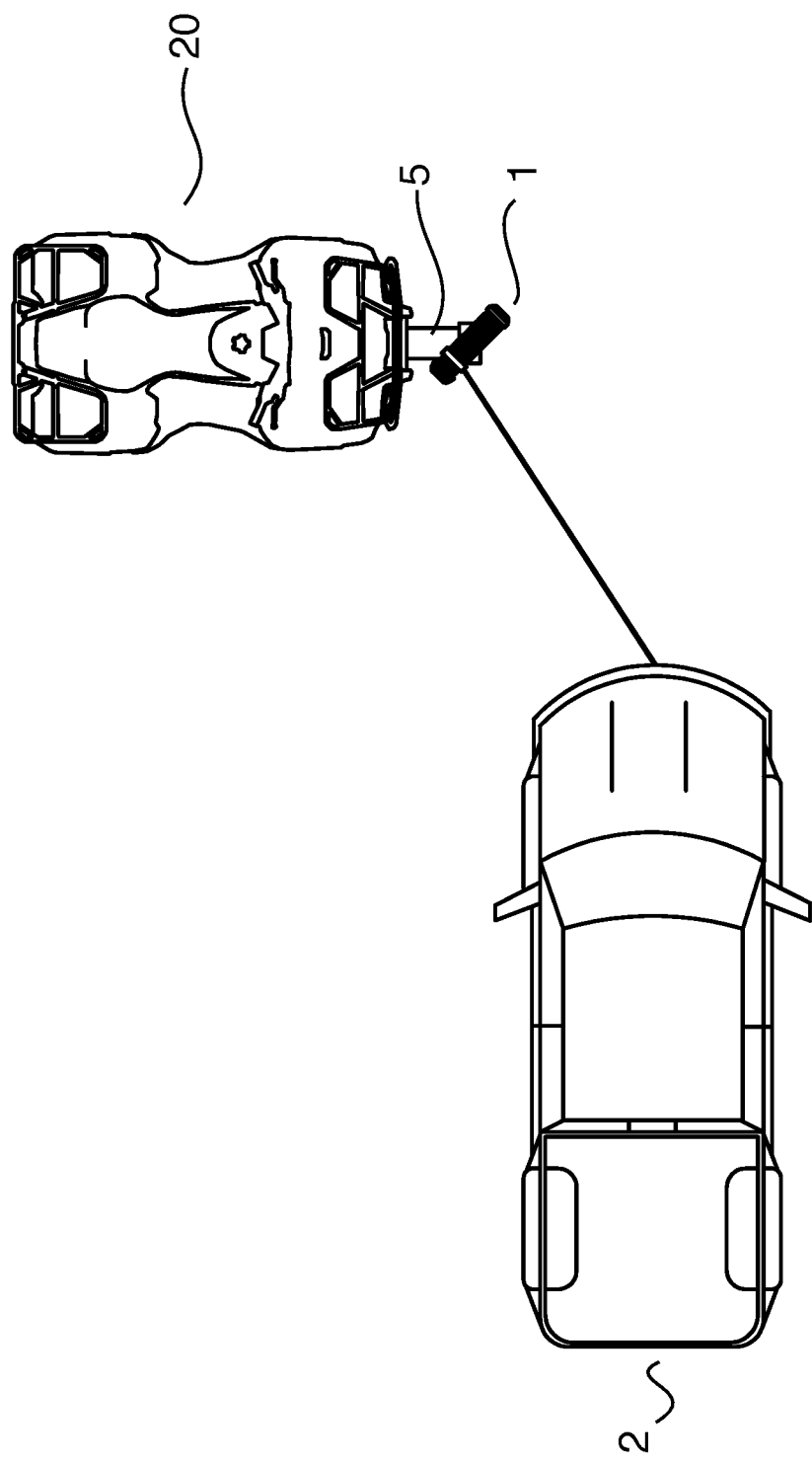
FIG. 4B is a top view of an ATV attached to the extendable winch assembly with a load attached wherein the winch is pivoted.

FIG. 4B depicts the vehicle 2 of FIG. 4A, wherein in the extendable winch assembly 1 has pivoted to directly face the vehicle 2, using the systems and methods described herein.

Figure 5A:
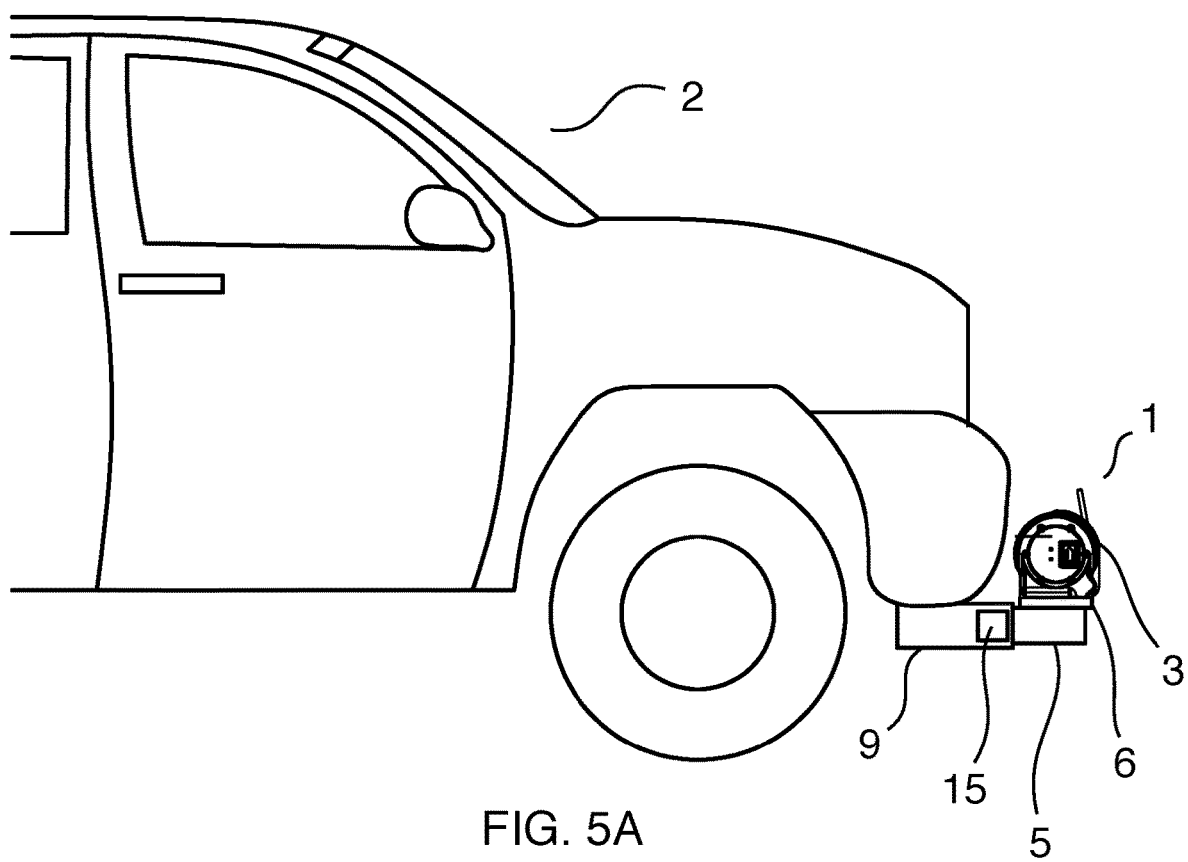
FIG. 5A is a side view of the extendable winch assembly attached to the underside of a vehicle.
Figure 5B:
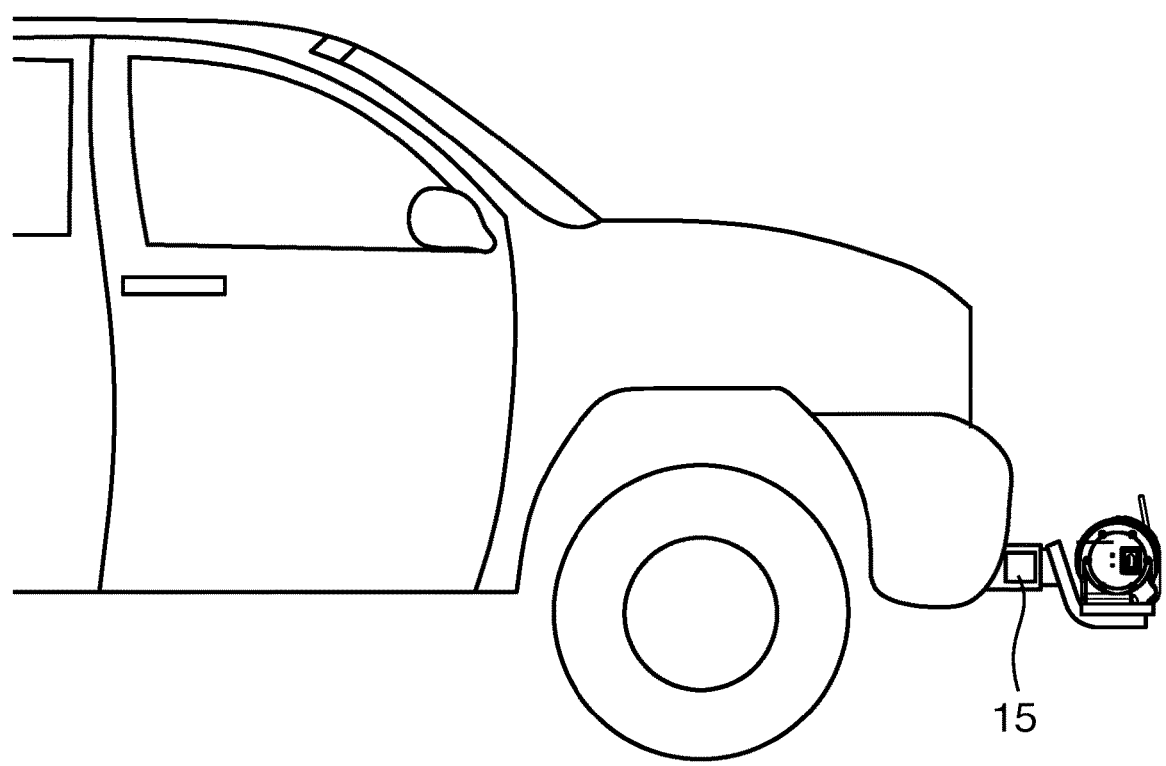
FIG. 5B is a side view of the extendable winch assembly attached to the front of a vehicle.

FIG. 5A illustrates the extendable winch assembly 1 attached to the underside of a vehicle 2. In this embodiment, the winch mount plate 6 is attached to the top of the extendable arm 5. A motor 15 moves the extendable arm such that it extends or retracts. FIG. 5B illustrates the extendable winch assembly 1 attached to the front of a vehicle 2. In this embodiment, the winch mount plate 6 is attached to the end of the extendable arm 5. This embodiment also comprises a motor 15 for extending the extendable arm.

Figure 6:
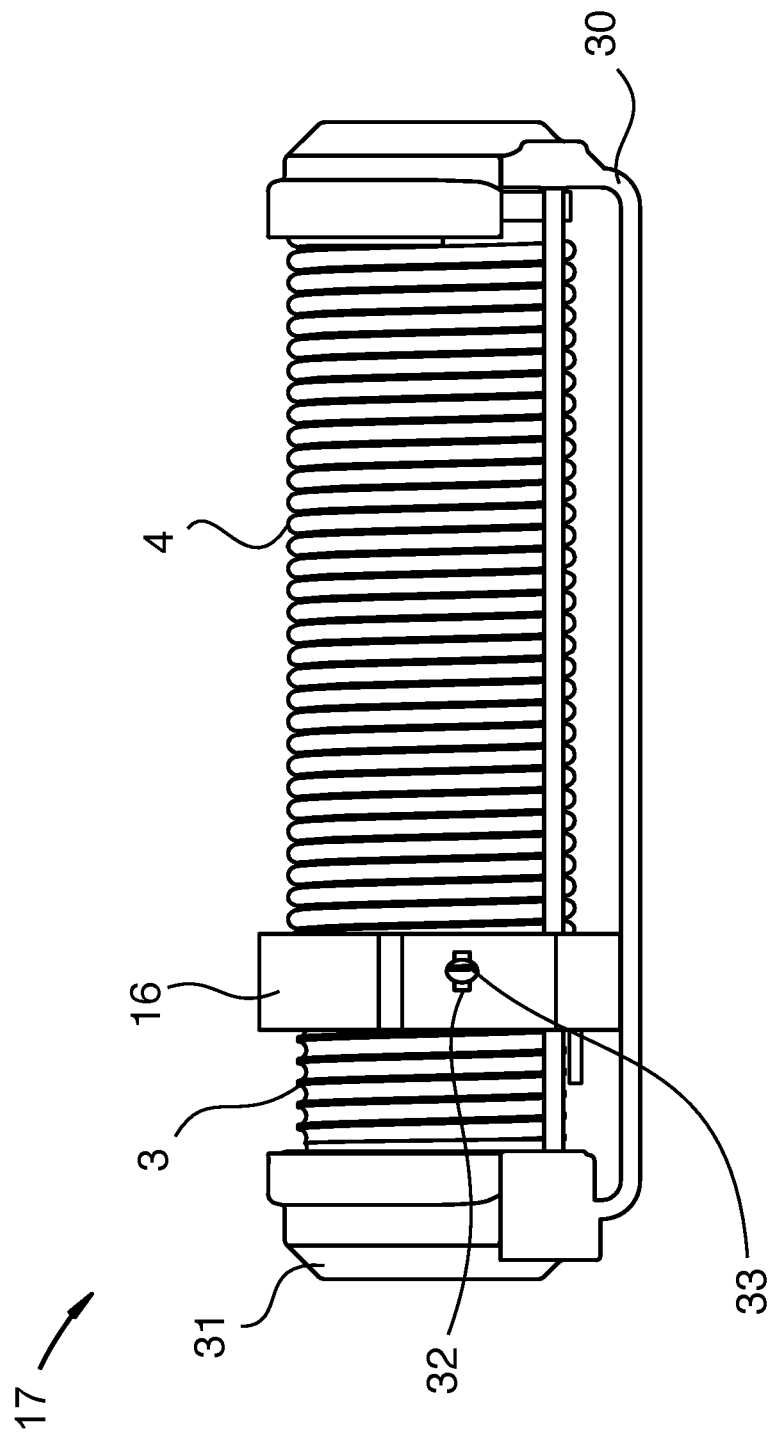
FIG. 6 is a front view of the extendable winch assembly.

FIG. 6 depicts a winch 17 with a winch frame 30. The fairlead 16 is near an end bracket 31. Two sensors 32 are placed opposite one another in proximity to the orifice 33 of the fairlead 16. This embodiment is advantageous because when a load is positioned at a wide angle relative to the winch 16, the line 4 will pull against one of the sensors 32. As the controller retrieves the sensor data, it will generate a command for the motor 15 to turn the winch 17. In another embodiment, the winch 17 comprises two sensors 32 placed at the top and bottom of the orifice 33 of the fairlead 16. With two sensors 32 positioned as such, the sensors 32 will be able to detect when the line 4 is pulling against the top of the orifice 33 of the fairlead 16, or when the line 4 is pulling against the bottom of the orifice 33 of the fairlead 16. This may occur when a load that a user desires to pull is positioned at a higher level or lower level than the winch is able to be positioned at. For example, if a user wishes to pull a boat out of water via a ramp, often times the ramp is at a slant and extendable winch assembly 1 would be higher than the boat. This would cause the line 4 to pull down against the fairlead 16. By positioning a sensor 32 at the bottom and top of the orifice 33 of the fairlead 16, the controller will sense when the line 4 is applying pressure to the sensor and generate a command for the motor 15 to rotate the extendable winch assembly 1 downwards until the pressure is relieved.

In yet another embodiment, the extendable winch assembly 1 comprises four sensors 32. This embodiment is advantageous because it relieves pressure whether it is applied to the top, bottom, or either side of the orifice 33 of the fairlead 16. In FIG. 6, the sensors 32 are placed on the outside of the fairlead. However, the sensors 32 may also be place on the inside of the fairlead 16. The sensor or sensors may be one or more of the following: an absolute pressure sensor, a sealed pressure sensor, a differential pressure sensor.

All patents and published patent applications referred to herein are incorporated herein by reference. The invention has been described with reference to various specific and preferred embodiments and techniques. Nevertheless, it understood that many variations and modifications may be made while remaining within the spirit and scope of the invention.

What is claimed is:

1. An extendable winch assembly, comprising:
   a winch, comprising:
      a drum for winding and unwinding a line; and
      a first motor for driving the drum about a winding axis;
   a winch mount for mounting the winch to a vehicle, the winch mount comprising:
      a base attached to the vehicle;
      an extendable arm attached at one end to the base, wherein the extendable arm is configured to move the winch from a retracted position proximate the vehicle to an extended position spaced from the vehicle; and
      a plate attached at an other end of the extendable arm, wherein the winch is attached to the plate in such a way as to allow the winch to pivot about a pivot axis perpendicular to the winding axis; wherein the extendable arm comprises a second motor that operates to extend and retract the extendable arm.

2. The invention of claim 1, wherein the winch mount comprises a locking pin and is manually extended and retracted.

3. The invention of claim 1, wherein the winch mount comprises a hand operated crank to extend and retract the extendable arm.

4. The invention of claim 1, further comprising a controller, wherein the second motor is controlled by a controller.

5. The invention of claim 4, wherein a user is able to instruct the controller to extend or retract the extendable arm.

6. The invention of claim 5, wherein the extendable winch assembly further comprises a crank, such that a user can selectively move the extendable arm by the crank or the second motor.

7. The invention of claim 1, further comprising sensors for detecting pressure, wherein each of the sensors detect pressure from the winch line and provide pressure data.

8. The invention of claim 7, further comprising a third motor for pivoting the winch, wherein the controller controls the motor by generating a command for the third motor, wherein the command is based on the pressure data, and wherein the motor pivots the winch based on the command.

9. The invention of claim 8, wherein the controller generates the command by determining a pivot position that minimizes the pressure data received from each of the sensors.

10. The invention of claim 9, wherein the controller compares the pressure data from each of the plurality of sensors with a predetermined pressure threshold, and generates the command when the pressure data from at least one of the plurality of sensors exceeds the predetermined pressure threshold.

11. The invention of claim 1, further comprising a guide rod mounted on the winch frame and disposed substantially parallel to the drum.

12. The invention of claim 11, further comprising a fairlead slidably attached to the guide rod, the fairlead comprising an orifice through which the winch line passes.

13. An extendable winch assembly, comprising:
   a winch, comprising:
      a drum for winding and unwinding a line;
      a first motor for driving the drum about a winding axis; and
      a fairlead through which the line passes as it wound and unwound from the drum;
   a winch mount for mounting the winch to a vehicle comprising:
      a base attached to the vehicle;
      an extendable arm attached at one end to the base, wherein the extendable arm is configured to move the winch from a retracted position proximate the vehicle to an extended position spaced from the vehicle;
      a second motor operable to extend and retract the extendable arm; and
      a plate attached to an other end of the extendable arm, wherein the winch is attached to the plate in such a way as to allow the winch to pivot about a pivot axis perpendicular to the winding axis;
      a third motor for pivoting the winch; and
      a controller that controls the movement of the first, second and third motors.

14. The invention of claim 13 further comprising at least two pressure sensors mounted on the fairlead, for sensing the pressure the line exerts on the fairlead from opposing lateral directions and generating pressure data.

15. The invention of claim 13, wherein the controller processes the pressure data and operates the third motor in such a way as to reduce the pressure on the fairlead.

16. The invention of claim 13, wherein the controller coordinates the movement of the second and third motor so that, when the third motor pivots the winch, the second motor extends the extendable arm far enough so that the winch does not hit the vehicle.

17. The invention of claim 13 wherein the controller is configured to receive commands from a user.

18. The invention of claim 13, wherein the controller causes the second motor to extend the extendable arm to the extended position before the third motor causes the winch to pivot.

19. The invention of claim 18, wherein the controller is configured to generate feedback to a user.

* * * * *